(12) United States Patent
Kim et al.

(10) Patent No.: US 7,653,829 B2
(45) Date of Patent: Jan. 26, 2010

(54) METHOD OF DATA PLACEMENT AND CONTROL IN BLOCK-DIVIDED DISTRIBUTED PARITY DISK ARRAY

(75) Inventors: Kap Dong Kim, Daejeon (KR); Song Woo Sok, Daejeon (KR); Hag Young Kim, Daejeon (KR); Myung Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 444 days.

(21) Appl. No.: 11/605,181

(22) Filed: Nov. 28, 2006

(65) Prior Publication Data

US 2007/0180299 A1     Aug. 2, 2007

(30) Foreign Application Priority Data

Dec. 8, 2005    (KR) ...................... 10-2005-0120129
Apr. 19, 2006    (KR) ...................... 10-2006-0035372

(51) Int. Cl.
     *G06F 11/00*      (2006.01)
(52) U.S. Cl. ....................................................... 714/6
(58) Field of Classification Search ...................... 714/6
See application file for complete search history.

(56) References Cited

U.S. PATENT DOCUMENTS

| | | | | |
|---|---|---|---|---|
| 4,761,785 A | * | 8/1988 | Clark et al. ................. | 714/805 |
| 5,708,668 A | * | 1/1998 | Styczinski ..................... | 714/6 |
| 5,915,094 A | | 6/1999 | Kouloheris et al. | |
| 5,960,169 A | * | 9/1999 | Styczinski ..................... | 714/6 |
| 6,427,184 B1 | | 7/2002 | Kaneko et al. | |
| 6,591,339 B1 | * | 7/2003 | Horst et al. ................. | 711/114 |
| 7,433,999 B2 | * | 10/2008 | Mochizuki et al. .......... | 711/114 |
| 2002/0156975 A1 | * | 10/2002 | Staub et al. ................. | 711/114 |
| 2003/0061441 A1 | * | 3/2003 | Yamamoto et al. .......... | 711/114 |
| 2004/0236985 A1 | * | 11/2004 | Durica et al. ................ | 714/7 |
| 2005/0120267 A1 | * | 6/2005 | Burton et al. ................ | 714/13 |
| 2005/0149678 A1 | * | 7/2005 | Stolowitz .................... | 711/114 |
| 2008/0065930 A1 | * | 3/2008 | Byrne et al. ................. | 714/6 |

FOREIGN PATENT DOCUMENTS

KR     1020040057901     7/2004

OTHER PUBLICATIONS

David A. Patterson, Peter Chen, Garth Gibson, and Randy H. Katz, Introduction to Redundant Arrays of Inexpensive Disks (RAID), pp. 112-117, 1989, IEEE.

* cited by examiner

*Primary Examiner*—Scott T Baderman
*Assistant Examiner*—Yair Leibovich
(74) *Attorney, Agent, or Firm*—Ladas & Parry LLP (57) ABSTRACT

A method of data placement and control in a block-divided distributed disk array is provided. At first, data to store is divided into logical blocks, and each of the divided logical blocks is further divided into a plurality of data blocks. Then, a parity block is created through performing an XOR operation on the data blocks of each logical block in a unit of a strip, and the parity block is arranged at the first block of a strip unit. Then, parity blocks are arranged at a next block of a previous logical block's the last data block through a left/right shifting for uniformly arranging the parity blocks through out all disks in order to fill an empty block between the logical blocks.

15 Claims, 7 Drawing Sheets

METHOD OF DATA PLACEMENT AND CONTROL IN BLOCK-DIVIDED DISTRIBUTED PARITY DISK ARRAY

RELATED APPLICATION

The present application is based on, and claims priority from, Korean Application Number 2005-120129, filed Dec. 8, 2005, and Korean Application Number 2006-35372, filed Apr. 19, 2006 the disclosure of which is hereby incorporated by reference herein in its entirety.

BACKGROUND OF THE INVENTION

1. Field of the Invention

The present invention relates to a method of data placement and control in a block-divided distributed parity disk array.

2. Description of the Related Art

A redundant array of independent disks (RAID) is one of representative data storage devices. The RAID is a high performance and mass storage device that provides single virtual disk using multiple physical disks, and the RAID is a safety device that recovers data by replicating data and storing replicated data in the multiple physical disks. The RAID device has a characteristic that the performance thereof becomes decreased if the reliability of the RAID increases. In the RAID, a disk level is classified according to a method of placing data and parity information in a disk. The RAID has different characteristics according to each of the disk levels.

A RAID 0 level is used to configure a high performance mass storage device without replicating data. In this case, the reliability thereof is degraded in proportional to the number of disks.

A RAID 1 level is a method of creating an exact copy of a set of data on two or more disks. The RAID 1 level provides high performance and superior reliability, but wastes the disk space.

A RAID 5 level is a method of enabling one parity block to recover one disk error through a disk. When a lot of physical disks are managed through the RAID 5 level, the performance is lowered, the reliability is degraded, and the safety problem is arisen.

In the RAID 5 level, a strip is arranged at each disk. In order to write one block, the RAID 5 level writes a new parity block and a new data block through performing an XOR operation on related blocks. Since two write operations are performed for writing one block, the RAID 5 level is inefficient.

If the write operation is performed through delay-writing that gathers blocks composing one strip and writes the blocks of one strip, an overhead occurs for buffering the blocks. The RAID has a disk error recovering function using multiple disks. However, the RAID is inefficient to process large data or multimedia data because the RAID was developed to process on general data.

SUMMARY OF THE INVENTION

Accordingly, the present invention is directed to a method of data placement and control in a block-divided distributed parity disk array that substantially obviates one or more problems due to limitations and disadvantages of the related art.

An object of the present invention is to provide a method of data placement and control in a block-divided distributed parity disk array for improving an input/output performance for large data, while sustaining an input/output performance for a small data in order to efficiently use a disk space for storing multimedia data without wasting the disk space.

Another object of the present invention is to provide a method of data placement and control in a block-divided distributed parity disk array for providing a disk error recovering function and improving an input/output performance for large data, while sustaining an input/output performance for a small data by dividing a large logical block into a plurality of data blocks and placing the data blocks and a parity block to a disk in a predetermined pattern in order to efficiently use a disk space for storing multimedia data without wasting the disk space.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of data placement and control in a block-divided distributed parity disk array, includes the steps of: dividing data to store into logical blocks, and dividing each of the divided logical blocks into a plurality of data blocks; creating a parity block through performing an XOR operation on the data blocks of each logical block in a unit of a strip; arranging the parity block at the first block of a strip unit which consists of the data blocks and the parity block in the logical block; and arranging parity blocks at a next block of a previous logical block's the last data block through a left/right shifting for uniformly arranging the parity blocks through out all disks in order to fill an empty block between the logical blocks.

The method may further include the steps of: locking a logical block to read; determining whether the disk is malfunctioned or not; determining whether more than two disks are malfunctioned or not, if the disk is malfunctioned; reporting a logical block read error if more than two disks are malfunctioned; and releasing the lock of the logical block.

The method may further include the steps of: reading all parity blocks and data blocks excepting blocks of the malfunctioned disk are read into a memory if one disk is malfunctioned only; creating a block value of a malfunctioned disk through performing an XOR operation on the read parity blocks and data blocks in a unit of a strip, and recording the created block value in the memory; and releasing the lock of the logical block.

The method may further include the steps of: reading all data blocks in the logical block into the memory if there are no malfunctioned disks; determining whether an error is generated while reading the data blocks; determining whether there is a strip where more than two read errors are generated if it determined that the error is generated while reading the data blocks; reporting a logical block read error if there is the strip where more than two errors are generated; and releasing the lock of the logical block.

The method may further include the steps of: reading a parity block of a strip having an error block if there is no strip where more than two read errors are generated; generating a value of an error block through performing an XOR operation on the read parity block; and releasing the lock of the logical block.

In order to write a logical block arranged by the method, the method may further include the steps of: locking a logical block to write; determining whether the disk is malfunctioned or not; determining whether more than two disks are malfunctioned or not if the disk is malfunctioned; reporting a logical block write error if more than two disks are malfunctioned; and releasing the lock of the logical block.

The method may further include the steps of: creating a parity block in a unit of a strip through performing an XOR operation if one disk is malfunctioned; writing corresponding blocks to all disks excepting the malfunctioned disk; and releasing the lock of the logical block.

The method may further include the steps of: creating a parity block in a unit of a strip through performing an XOR operation if there is no malfunctioned disk; writing corresponding parity blocks to all disks; and releasing the lock of the logical block.

In order to read data blocks arranged by the method, the method may further include the steps of: locking a strip having data blocks to read; determining whether a disk having the data blocks to read is malfunctioned or not; reading the data block from the disk to a memory if the disk is not malfunctioned; and releasing the lock of the strip.

The method may further include the steps of: determining other disks having the strip of the malfunctioned disk if the disk is malfunctioned; reporting a data block read error if the other disks are malfunctioned; and releasing the lock of the strip having the data blocks.

The method may further include the steps of: reading all data blocks and a parity block of a corresponding strip to a memory if it determines that the disk having the data blocks to read is malfunctioned only; writing a value, which is created by performing an XOR operation on the all blocks, to a memory; and releasing the lock of the strip having the data blocks.

In order to write a data block arranged by the method, The method may further include the steps of: locking a strip having data blocks to write; determining whether a disk having the data blocks to write is malfunctioned or not; determining whether a disk having a parity block is malfunctioned or not if the disk having the data blocks is not malfunctioned; writing the data blocks to the disk if the disk of the parity block is not malfunctioned; and releasing the lock of the strip having the data blocks.

The method may further include the steps of: determining whether other disks are malfunctioned or not if the disk having the data block to write and the disk having the parity block are not malfunctioned; reading all data blocks belonged to the strip excepting blocks to write to a memory if other disks are not malfunctioned; creating a new parity block through performing an XOR operation on the data blocks to write and the read data blocks; writing the new parity block; writing the new data block to a disk; and releasing the lock of the strip having the data blocks to write.

The method may further include the steps of: reading parity blocks and data blocks excepting those belonged to the malfunctioned disk to a memory if the disk having the data block to write and the disk having the parity block are not malfunctioned and other disks are malfunctioned; creating a data block value of the malfunctioned disk by performing an XOR operation on the read blocks; creating a new parity block through performing an XOR operation between data blocks by placing the created new data block value to the data blocks to write; writing new parity blocks; writhing new data blocks to a disk; and releasing the lock of the strip having the data blocks.

The method may further include the steps of: reading all data blocks of a strip having data blocks to a memory if the disk having the data block to write is only malfunctioned; creating a new parity block by performing an XOR operation on the read data blocks and the data blocks to write; writing a new parity block to a disk; and releasing the lock of the strip having the data block to write.

The method of data placement and control in a block-divided distributed parity disk array according to the present invention can provide the performance required by a multimedia file system, while sustaining a comparability with a general file at the same time by providing a read/write control path for logical blocks (2048K, 1024K, 512K, 256K) that support the multimedia file system as well as a general data block.

Also, the input/output load is uniformly distributed to all disks by arranging the parity blocks through left/right shifting parity arrangement. Furthermore, the disk spaces are maximally utilized without empty blocks according to the present invention. Moreover, the block-divided distributed parity disk array according to the present invention can be used as a high reliable storage device for a multimedia file system due to the fault tolerance for one malfunctioned disk.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
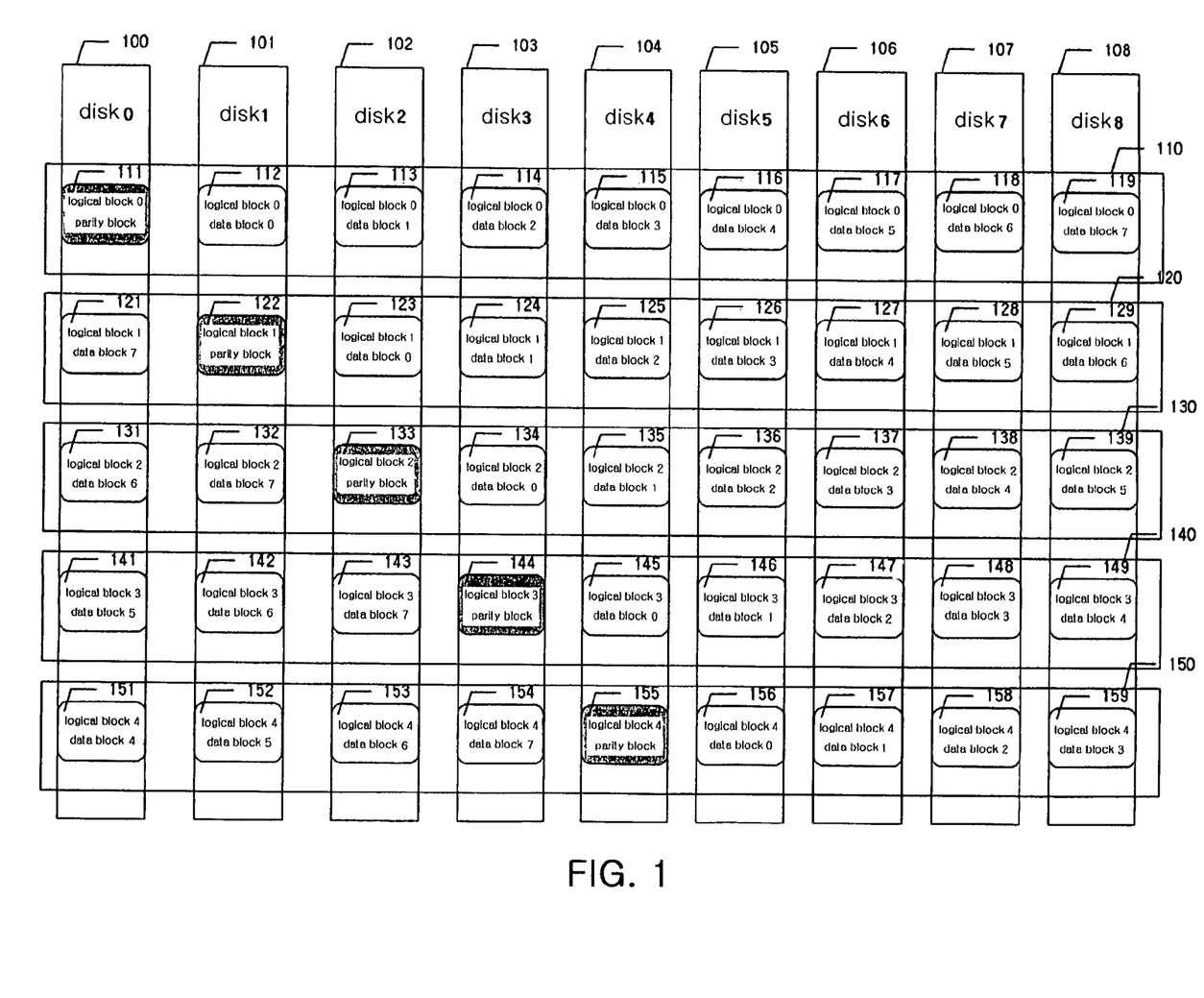
FIG. 1 is a view illustrating a block-divided distributed parity disk array according to an embodiment of the present invention when N is 8, which is a multiple of two.

FIG. 1 is a view illustrating a block-divided distributed parity disk array according to an embodiment of the present invention when N is 8 which is a multiple of two. That is, the disk array of FIG. 1 consists of nine disks.

As shown, if the disk array consists of (N+P) disks where P is 1 and N is multiple of two, each of logical blocks 110, 120, 130, 140 and 150 is divided into N data blocks, and N data blocks are distributed and written in N disks. A parity block of each logical block is placed at the front of the first data block of each logical block.

The first logical block 110 is arranged at first to seventh data blocks 112 to 119 and a parity block 111, which are N uniformly divided blocks. The parity block 111 is placed at the front of the first data block 112.

The parity block of an $i^{th}$ logical block is arranged at the $i^{th}$ block of a (i % (N+1)) disk.

The $j^{th}$ data block of an $i^{th}$ logical block is arranged at the $i^{th}$ block of a ((i+j+1) % (N+1)) disk.

Figure 2:
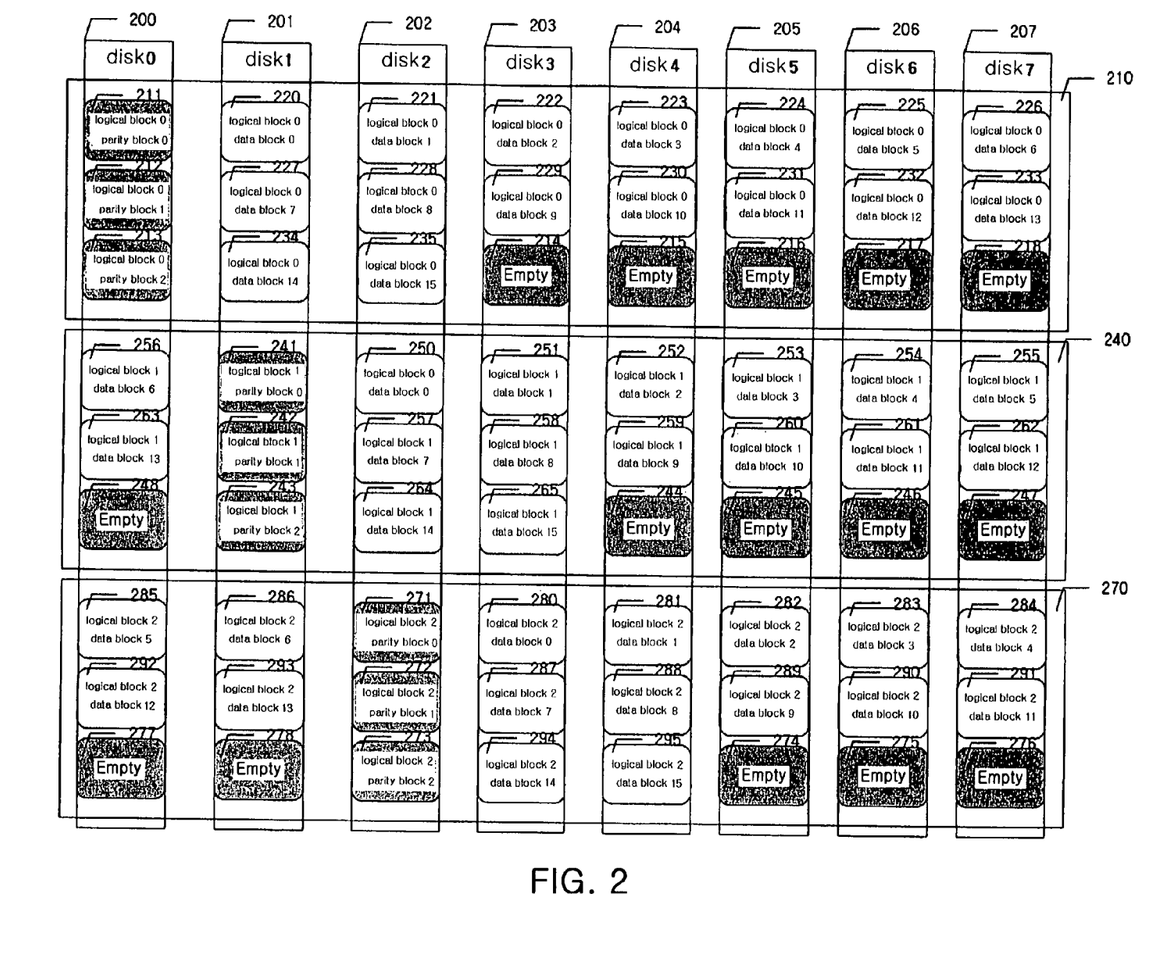
FIG. 2 is a view illustrating a block-divided distributed parity disk according to an embodiment of the present invention when N is 7, which is not a multiple of two.

FIG. 2 is a view illustrating a block-divided distributed parity disk according to an embodiment of the present invention when N is 7, which is not a multiple of two. That is, FIG. 2 shows a disk array consisted of eight disks.

As shown in FIG. 2, the logical block 210 is divided into a plurality of data blocks 220 to 235. The number M of divided data blocks is decided by a smallest $2^k$ value that satisfies $N<2^k$ and $2^k/N>1$. When N is 7, M becomes 16. The maximum number H of blocks to be allocated to one disk is $(2^k/N)+1$. In the example shown in FIH. 2, H is, 3.

The first logical block 210 is arranged through 16 data blocks 220 to 235, three parity block 211 to 213 and five empty blocks 214 to 218. N+1 blocks are defined as one strip consisted of N data blocks and one parity block. In one strip, a parity block is arranged at the front of the first data block. The parity blocks are arranged in the logical blocks by shifting its location one block to right. The location of the parity block of the $i^{th}$ logical block and the locations of a corresponding disk and block of a $j^{th}$ data block are not described herein. It will be described with reference to FIG. 3 as a generalized equation for calculating the location and the disk of a corresponding block.

Figure 3:
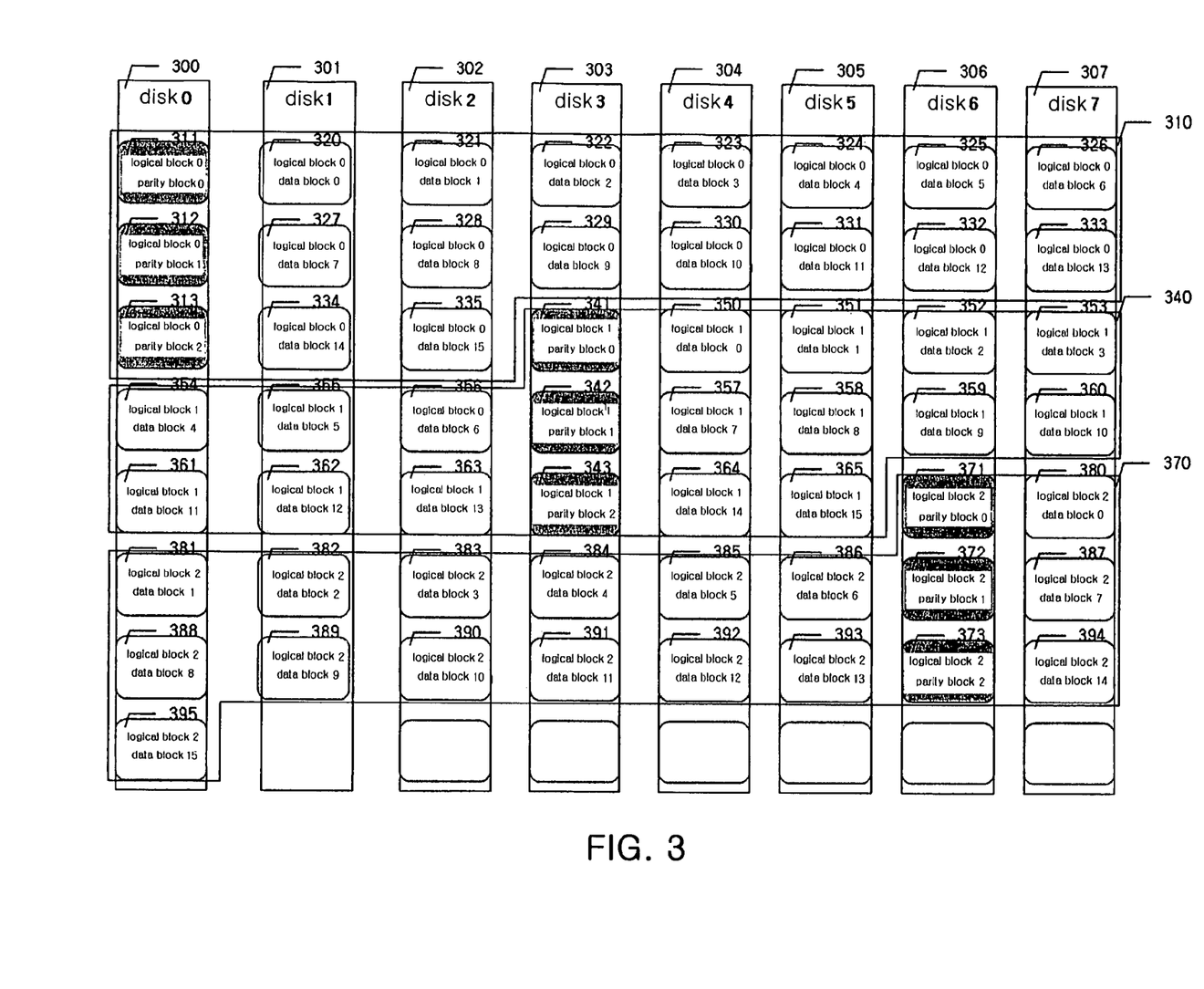
FIG. 3 is a view showing a block-divided distributed parity disk array when N is 7 which is not a multiple of two. That is, the disk array consists of eight disks.

FIG. 3 is a view showing a block-divided distributed parity disk array when N is 7, which is not a multiple of two. That is, the disk array consists of eight disks.

The difference between the disk arrays in FIGS. 2 and 3 is to use the empty blocks as the data block and the parity block. A first logical block 310 consists of three strips, and all parity blocks are arranged at the front of the first data block in each strip. The last strip consists of data blocks 334 and 335 and a parity block 313. As shown in FIG. 3, a block after the last data block 335 of the first logical block 310 is used as the first block 341 of the next logical block 340 instead of leaving as an empty block. According to the number of blocks in the last strip, the arrangement of a parity block is shifted to the right or the left. That is, the parity blocks are uniformly distributed to entire disks without wasting blocks.

The data placement according to the present embodiment can be expressed as follows. When the number of disks is N+1, the number D of the data blocks in single logical block is calculated by dividing one logical block by $2^k$ that stratifies $N<2^k$ and $(2^k/N)>1$. The maximum number H of blocks to be allocated in one disk for single logical block is $(2^k/N)+1$, and the number of parity blocks is identical to the number of strips in single logical block.

The number L of blocks in the last strip is (2k % N)+1. If the location of each block is generalized, the $j^{th}$ parity block of an $i^{th}$ logical block is the $(((D+H)\times i)/(N+1)+j)^{th}$ block of a $((L\times i)\ \%\ (N+1))^{th}$ disk.

The $j^{th}$ data block of an $i^{th}$ logical block is located at $(((D+H)\times i+j+1)/(N+1))^{th}$ block of a $(((L\times i)+j+1)\ \%\ (N+1))^{th}$ disk.

Herein, % denotes a modulus operator, and / denotes an integer division operator.

The sequence number of the disk, the logical blocks, the parity blocks and the data blocks begin with zero.

When N is a multiple of two as like as the disk array shown in FIG. 1, the shown generalized equation for calculating the location can be used as well, and the maximum number H of blocks to be allocated in one disk for one logical block is calculated as $2^k/N$.

An interface for the logical block is an input/output path for a mass capacity block required to process a multimedia file defined as 2048K, 1024K, 521K and 256K, and an interface for a data block is an input/output path for a small capacity block.

Figure 4:
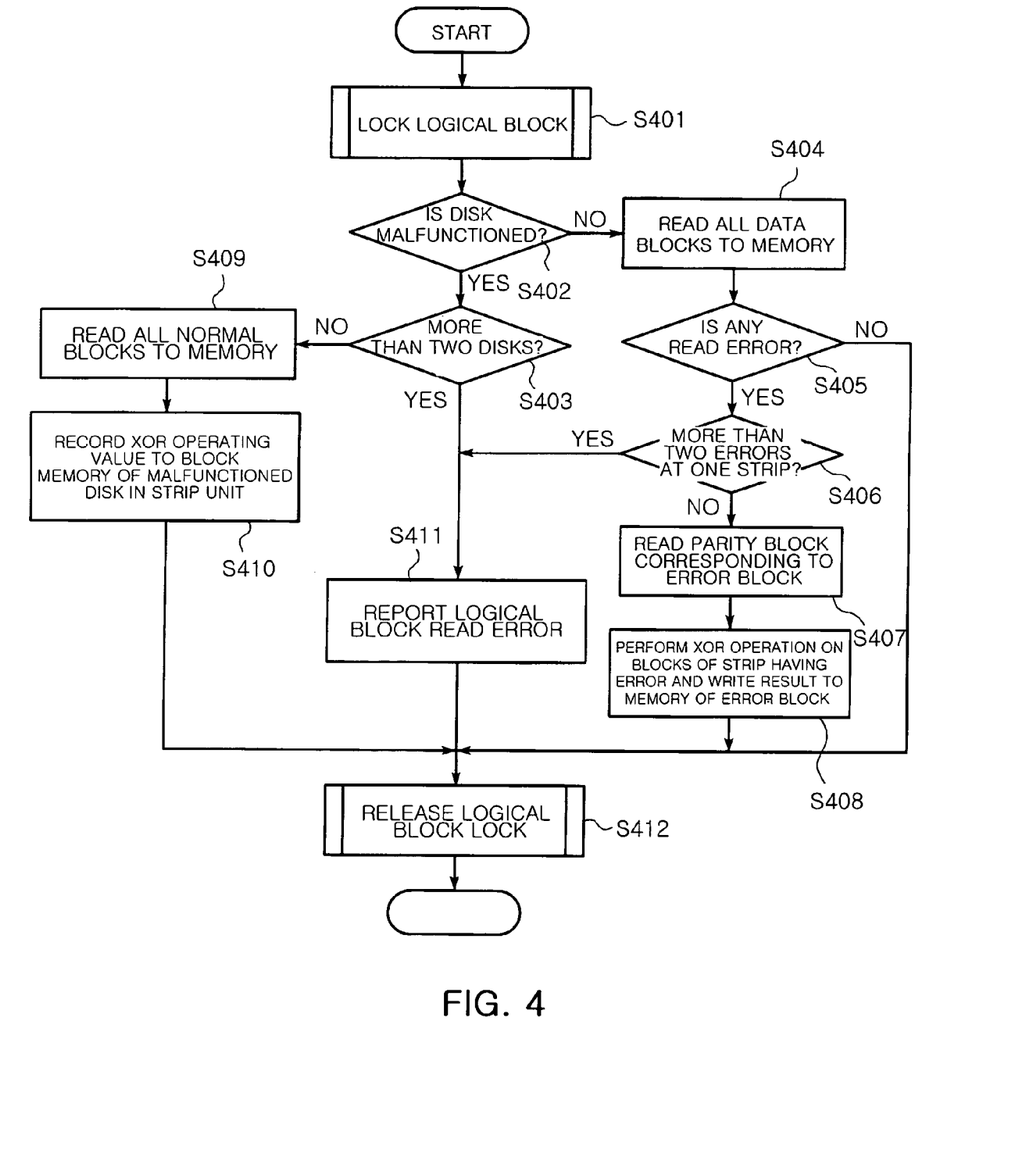
FIG. 4 is a flowchart illustrating a method of controlling a logical block read operation in a block-divided distributed parity disk array according to an embodiment of the present invention.

FIG. 4 is a flowchart illustrating a method of controlling a logical block read operation in a block-divided distributed parity disk array according to an embodiment of the present invention.

Referring to FIG. 4, in order to read a logical block, a logical block to read is locked at step S401, and it determines whether disks are malfunctioned or not at step S402. If more than 2 disks are malfunctioned at step S403, the logical block read error is reported at step S411, and the lock of the logical block is released at step S412.

If one disk is malfunctioned at step S403, all parity blocks and data blocks excepting the blocks in the malfunctioned disk are read into a memory at step S409. Then, the block values of the malfunctioned disk are calculated through performing the XOR operation on the parity block and data block in the unit of a strip, and the created block values are recorded in the memory at step S410. Then, the lock of the logical block to read is released at step S412.

Meanwhile, if there is no malfunctioned disk at step S402, all data blocks in logical blocks are read into a memory at step S404. If an error is generated while reading the data blocks into the memory at step S405 and if there is a strip with more than two read errors generated at step S406, the logical block read error is reported at step S411. If not, the value of the error block is generated through performing an XOR operation at step S408 by reading the parity block of the strip having the error block at step S407.

Figure 5:
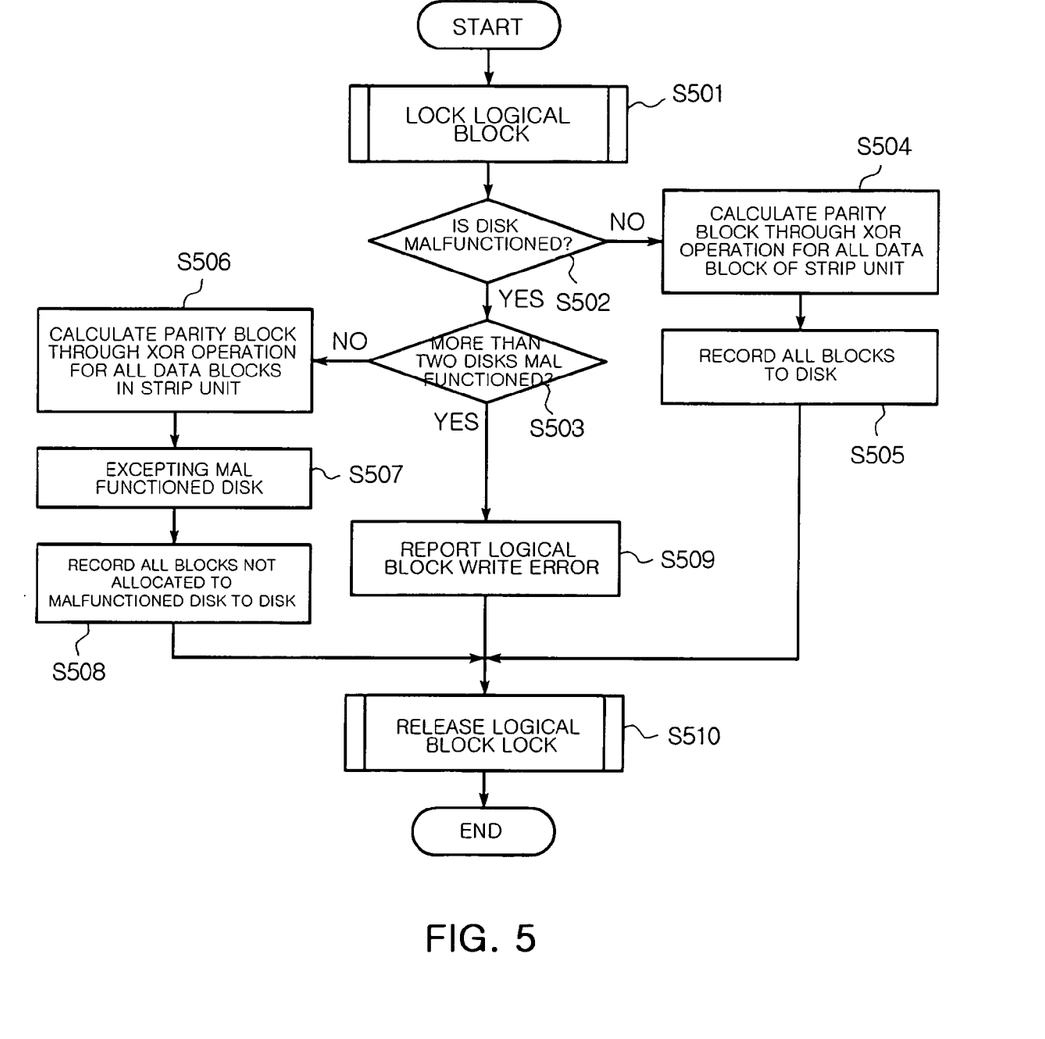
FIG. 5 is a flowchart showing a method of controlling a logical block write operation in a block-divided distributed parity disk in accordance with an embodiment of the present invention.

FIG. 5 is a flowchart showing a method of controlling a logical block write operation in a block-divided distributed parity disk in accordance with an embodiment of the present invention.

As shown in FIG. 5, a block lock is allocated to a logical block to write at step S501, and it determines whether any disks are malfunctioned or not at step S502. If more than two disks are malfunctioned at step S503, the logical block write error is reported at step S509, and the block lock is released at step S510.

If one disk is malfunctioned at step S503, a parity block is created in a unit of a strip through an XOR operation at step S506. Then, corresponding blocks are written to all disks excepting the malfunctioned disk at steps S507 and S508.

If there is no malfunctioned disk at step S502, a parity block is created in a unit of a strip through an XOR operation at step S504, and corresponding blocks are written in all disks at step S505.

Figure 6:
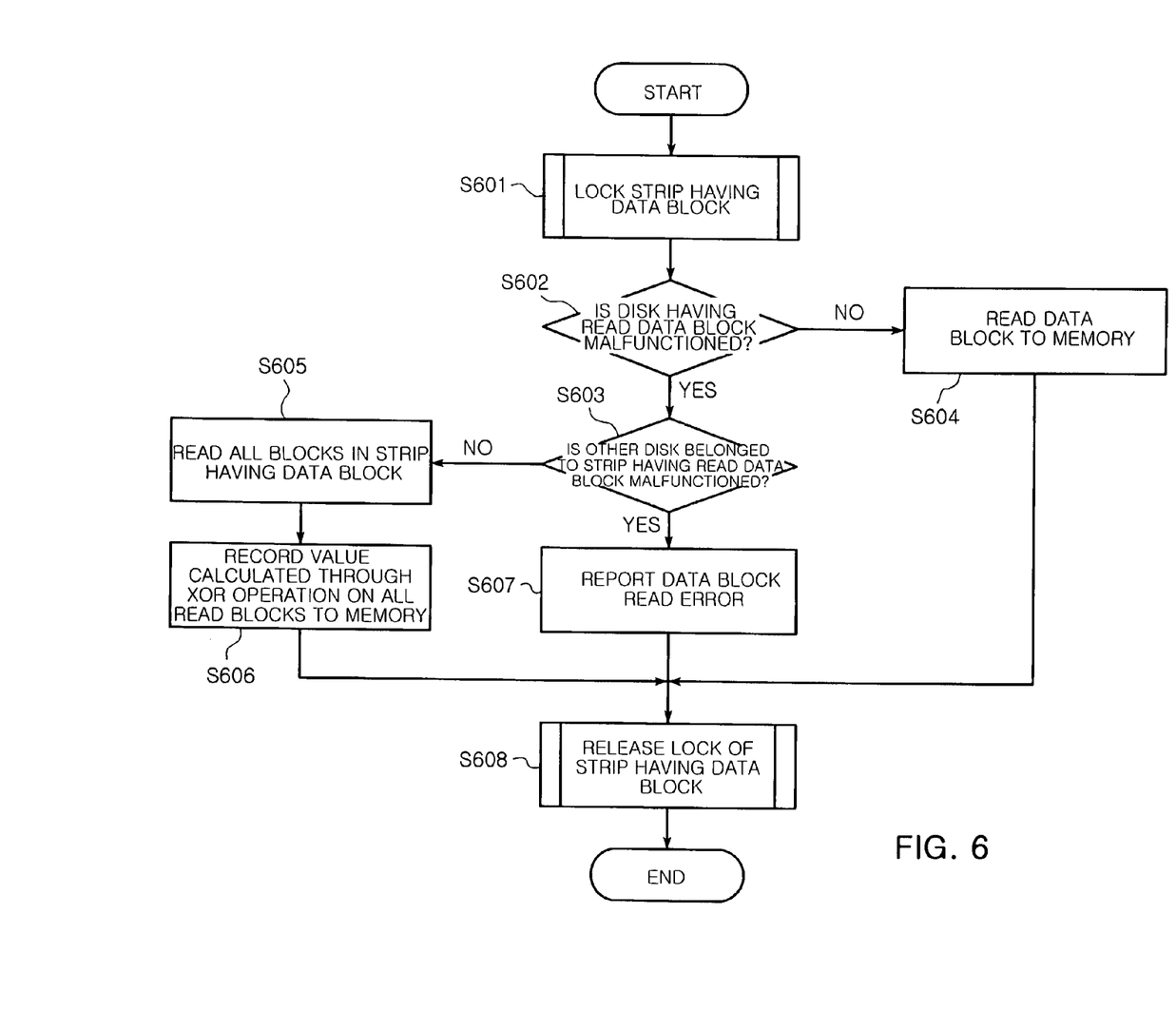
FIG. 6 is a flowchart showing a method of controlling a data block read operation in a block-divided distribute parity disk array according to an embodiment of the present invention.

FIG. 6 is a flowchart showing a method of controlling a data block read operation in a block-divided distribute parity disk array according to an embodiment of the present invention.

As shown in FIG. 6, a strip having a data block to read is locked at step S601. Then, it determines whether any disks having the data blocks to read are malfunctioned or not at step S602.

If there is no malfunctioned disk, the data blocks are read from the disks to a memory at step S604, and the lock of the strip having the data blocks is released at step S608.

If the disks having the data blocks to read are malfunctioned in the operation S602, and if another disk belonged to the strip is also malfunctioned at step S603, the data block read error is reported at step S607. Then, the lock of the strip having the data block to read is released at step S608.

If the disk having the data blocks to read is only malfunctioned at step S603, all data blocks and a parity block in a corresponding strip are read into a memory at step S605. Then, a value, which is created by performing an XOR operation on all blocks, is recorded in the memory at step S606.

Figure 7:
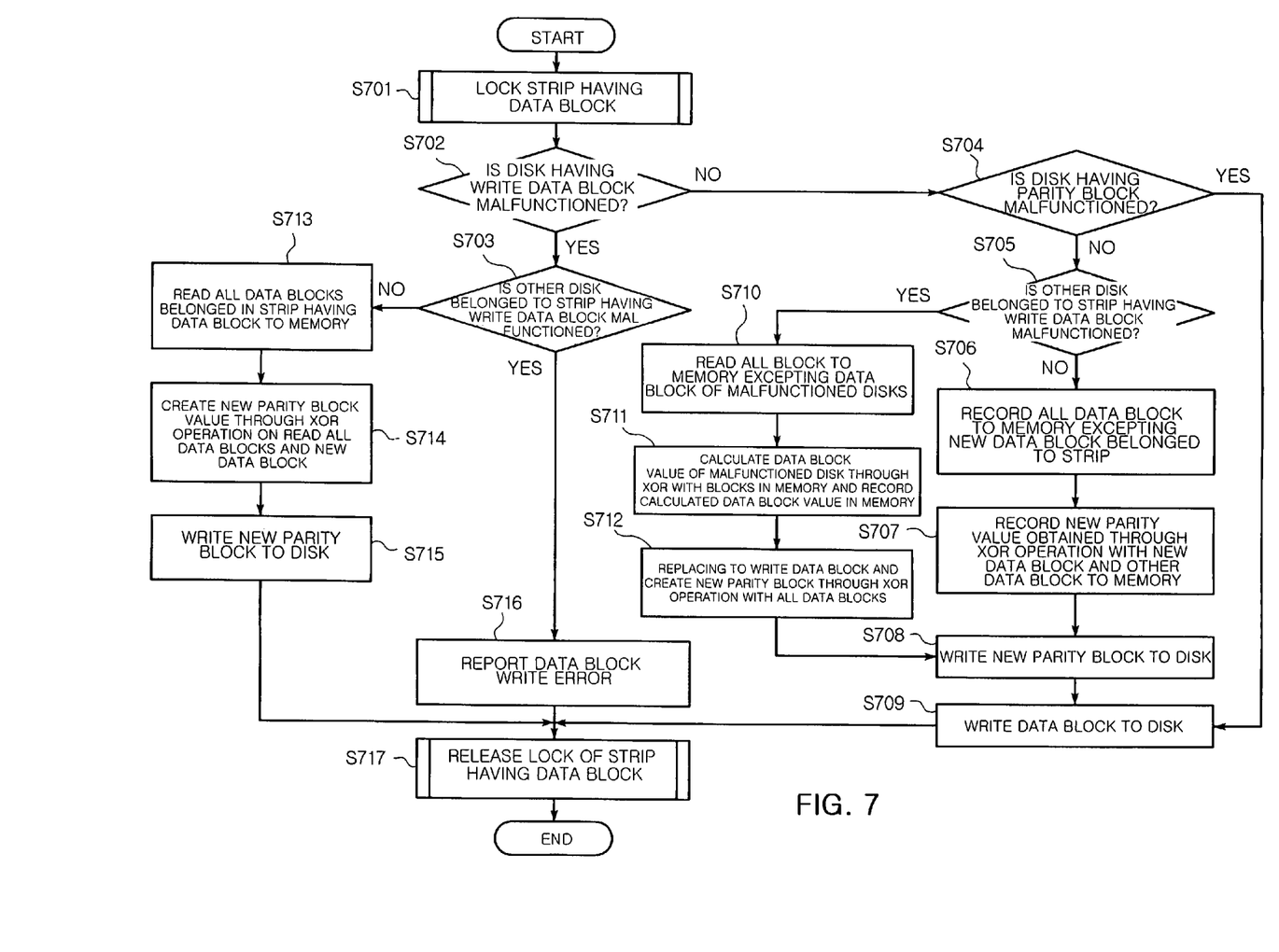
FIG. 7 is a flowchart of a method for controlling a data block write operation in a block-divided distributed parity disk array according to an embodiment of the present invention.

FIG. 7 is a flowchart illustrating a method for controlling a data block write operation in a block-divided distributed parity disk array according to an embodiment of the present invention.

Referring to FIG. 7, a strip having data blocks to write is locked at step S701, and it determines whether a disk having a data block to write is malfunctioned or not at step S702. The data block write operation is differently controlled according to the location of the malfunctioned disk. If a target disk is not malfunctioned and a disk having a parity block is malfunctioned at step S704, the data block is written in the disk at step S709 and the lock to the strip is released at step S717.

If the target disk and the parity disk are not malfunctioned at step S704 and other disks are not malfunctioned at step S705, all data blocks belonged in the strip excepting the blocks to write are read into the memory at step S706, and a new parity block is created by performing an XOR operation on the data block to write and the read data block at step S707. Then, the new created parity block is written at step S708, and a new data block is written in disks at step S709.

Meanwhile, if the target disk and the parity disk are not malfunctioned at step S702 and S704, and if other disk is malfunctioned at step S705, all of the parity block and the data blocks excepting the data blocks of the malfunctioned disk are read into the memory at step S710. Then, the data block values of the malfunctioned disk are generated by performing an XOR operation on the read blocks at step S711. Then, the generated data block values are placed at the locations of data blocks to write, and a new parity block is created at S712 by performing an XOR operation on the data blocks. Then, the new parity block is recorded at step S708, and the new data blocks are recorded in disks at step S709.

If the target disk is malfunctioned only at the steps S702 and S703, all data blocks in the strip having the data block to write are read into the memory at step S713. Then, a new parity block is created through an XOR operation on the read data blocks and the data blocks to write at step S714. Then, the new parity block is written in the disk at step S715.

The block-divided distributed parity disk array according to the present invention can provide the performance required by a multimedia file system, while sustaining a comparability with a general file at the same time by providing a read/write control path for logical blocks (2048K, 1024K, 512K, 256K) that support the multimedia file system as well as a general data block.

Also, the input/output load is uniformly distributed to all disks by arranging the parity blocks through left/right shifting parity arrangement. Furthermore, the disk spaces are maximally utilized without empty blocks according to the present invention. Moreover, the block-divided distributed parity disk array according to the present invention can be used as a high reliable storage device for a multimedia file system due to the fault tolerance for one malfunctioned disk.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of data placement and control in a block-divided distributed parity disk array, that improves input/output performance for large data, wherein the disk array is arranged to form strip lines, comprising the steps of: dividing data to store into at least one to a plurality of logical blocks, and dividing each of the logical blocks into M data blocks; generating H parity blocks by performing XOR operations on the data blocks of each logical block, forming H strip units per logical block, wherein H and M depend on the number of disks in the array; arranging each of the H parity blocks of the first logical block as first blocks of a each strip unit;

arranging a next parity block of a next logical block at a next block after the last data block of a previous logical block in the same strip line; arranging each parity block in the next logical block at a first block of each strip unit of the next logical block, wherein the next logical block has a same number of strip units as the previous block, wherein the strip unit of the next logical block has a same number of data blocks and parity blocks as in the strip unit of the previous logical block, and wherein each disk of the disk array that begins with a first disk to a last disk are continuously filled with logical blocks, which begins with the first parity block of the first logical block to a last data block of a last logical block comprising data blocks and parity blocks without any empty block between the logical blocks.

2. The method of claim 1, further comprising the steps of:
locking a logical block to read;
determining whether the disk is malfunctioned or not;
determining whether more than two disks are malfunctioned or not, if the disk is malfunctioned;
reporting a logical block read error if more than two disks are malfunctioned; and
releasing the lock of the logical block.

3. The method of claim 2, further comprising the steps of:
reading all parity blocks and data blocks, which except blocks of the malfunctioned disk that are read into a memory if only one disk is malfunctioned;
creating a block value of a malfunctioned disk through performing an XOR operation on the read parity blocks and data blocks in a unit of a strip, and recording the created block value in the memory; and
releasing the lock of the logical block.

4. The method of claim 2, further comprising the steps of:
reading all data blocks in the logical block into the memory if there are no malfunctioned disks;
determining whether an error is generated while reading the data blocks;
determining whether there is a strip where more than two read errors are generated if it determined that the error is generated while reading the data blocks;
reporting a logical block read error if there is the strip where more than two errors are generated; and
releasing the lock of the logical block.

5. The method of claim 4, further comprising the steps of:
reading a parity block of a strip having an error block if there is no strip where more than two read errors are generated;

generating a value of an error block through performing an XOR operation on the read parity block; and releasing the lock of the logical block.

6. The method of claim 1, wherein, in order to write a logical block arranged by the method, the method further comprises the steps of:

Locking a logical block to write;

determining whether the disk is malfunctioned or not;

determining whether more than two disks are malfunctioned or not if the disk is malfunctioned;

reporting a logical block write error if more than two disks are malfunctioned; and releasing the lock of the logical block.

7. The method of claim 6, further comprising the steps of:

creating a parity block in a unit of a strip through performing an XOR operation if one disk is malfunctioned;

writing corresponding blocks to all disks, which are excepting the malfunctioned disk; and releasing the lock of the logical block.

8. The method of claim 6, further comprising the steps of:

creating a parity block in a unit of a strip through performing an XOR operation if there is no malfunctioned disk;

writing corresponding parity blocks to all disks; and releasing the lock of the logical block.

9. The method of claim 1, wherein, in order to read data blocks arranged by the method, the method further comprises the steps of:

locking a strip having data blocks to read;

determining whether a disk having the data blocks to read is malfunctioned or not;

reading the data block from the disk to a memory if the disk is not malfunctioned; and releasing the lock of the strip.

10. The method of claim 9, further comprising the steps of:

determining other disks having the strip of the malfunctioned disk if the disk is malfunctioned;

reporting a data block read error if the other disks are malfunctioned; and releasing the lock of the strip having the data blocks.

11. The method of claim 10, further comprising the steps of:

reading all data blocks and a parity block of a corresponding strip to a memory if it determines that the disk having the data blocks to read is malfunctioned only;

writing a value, which is created by performing an XOR operation on the all blocks, to a memory; and releasing the lock of the strip having the data blocks.

12. The method of claim 1, wherein, in order to write a data block arranged by the method, the method further comprises the steps of:

locking a strip having data blocks to write;

determining whether a disk having the data blocks to write is malfunctioned or not;

determining whether a disk having a parity block is malfunctioned or not if the disk having the data blocks is not malfunctioned;

writing the data blocks to the disk if the disk of the parity block is not malfunctioned; and releasing the lock of the strip having the data blocks.

13. The method of claim 12, further comprising the steps of:

determining whether other disks are malfunctioned or not if the disk having the data block to write and the disk having the parity block are not malfunctioned;

reading all data blocks belonged to the strip excepting blocks to write to a memory if other disks are not malfunctioned;

creating a new parity block through performing an XOR operation on the data blocks to write and the read data blocks;

writing the new parity block;

writing the new data block to a disk; and releasing the lock of the strip having the data blocks to write.

14. The method of claim 12, further comprising the steps of:

reading parity blocks and data blocks excepting those belonged to the malfunctioned disk to a memory if the disk having the data block to write and the disk having the parity block are not malfunctioned and other disks are malfunctioned;

creating a data block value of the malfunctioned disk by performing an XOR operation on the read blocks;

creating a new parity block through performing an XOR operation between data blocks by placing the created new data block value to the data blocks to write;

writing new parity blocks;

writhing new data blocks to a disk; and releasing the lock of the strip having the data blocks.

15. The method of claim 12, further comprising the steps of:

reading all data blocks of a strip having data blocks to a memory if the disk having the data block to write is only malfunctioned;

creating a new parity block by performing an XOR operation on the read data blocks and the data blocks to write;

writing a new parity block to a disk; and releasing the lock of the strip having the data block to write.

* * * * *